United States Patent [19]

Wallace

[11] 4,262,038

[45] Apr. 14, 1981

[54] COATED INTERNAL THREADS AND METHOD OF PRODUCING SAME

[75] Inventor: Richard B. Wallace, Bloomfield Hills, Mich.

[73] Assignee: The Oakland Corporation, Troy, Mich.

[21] Appl. No.: 619,244

[22] Filed: Oct. 3, 1975

[51] Int. Cl.³ ............................................. B05D 3/02
[52] U.S. Cl. .................................... 427/181; 10/10 P; 411/189; 427/195; 427/375
[58] Field of Search ......................... 151/7; 10/10 P; 427/194, 195, 181, 235, 375

[56] References Cited

U.S. PATENT DOCUMENTS

| | | | |
|---|---|---|---|
| 2,118,526 | 5/1938 | Robinson | 117/DIG. 8 |
| 2,200,155 | 5/1940 | Camp et al. | 117/DIG. 8 |
| 2,789,926 | 4/1957 | Finholt et al. | 427/194 X |
| 3,231,948 | 2/1966 | Dempsey | 427/193 X |
| 3,232,780 | 2/1966 | Kupits | 427/195 X |
| 3,416,492 | 12/1968 | Greenleaf | 151/7 X |
| 3,513,016 | 5/1970 | Wood et al. | 427/185 X |
| 3,669,707 | 6/1972 | Donnelly et al. | 427/194 X |
| 3,731,724 | 5/1973 | Dorflinger | 151/7 |
| 3,797,455 | 3/1974 | Scheffer et al. | 118/308 |
| 3,894,509 | 7/1975 | Duffy et al. | 118/308 X |
| 3,975,787 | 8/1976 | Newnam | 10/10 P X |

FOREIGN PATENT DOCUMENTS 1216738  12/1970  United Kingdom ...................... 151/7

*Primary Examiner*—Shrive P. Beck
*Attorney, Agent, or Firm*—Whittemore, Hulbert & Belknap

[57] ABSTRACT

A nut having a threaded opening in which the sides of the threads are substantially uniformly coated from root to crest thereof with a thermoplastic material; also the method of producing the article in which an excess of powdered thermoplastic material is provided to fill the threaded opening with an excess of material extending beyond an end of the opening. Thereafter, the material is compacted by pressure or vibration to insure that the powdered material substantially fills the thread grooves. The nut is then heated, softening or melting those particles in contact with the thread surfaces, adhering them thereto, after which the remaining material in the threaded opening is eliminated.

17 Claims, 2 Drawing Figures

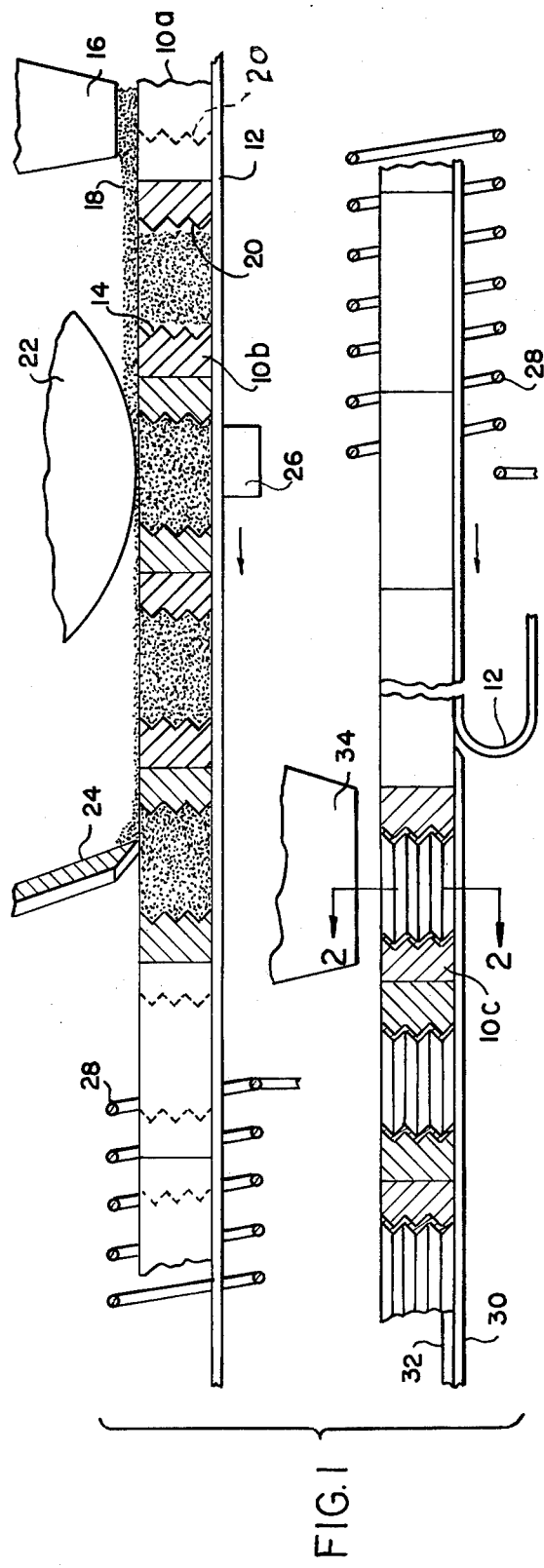
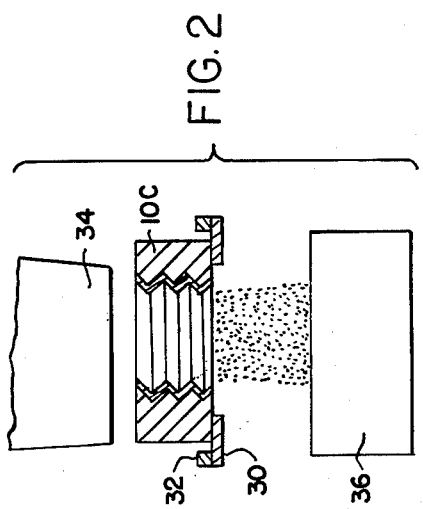

COATED INTERNAL THREADS AND METHOD OF PRODUCING SAME

BRIEF SUMMARY OF THE INVENTION

The problem of supplying a coating such as a suitable resin, to threads provided at the interior of a threaded article such as a nut has presented many difficulties. Such an article may be a friction nut capable of producing a fluid-tight seal, or the like. A suitable coating for this purpose may be any of numerous resins, and in accordance with the present invention a thermoplastic resin is employed, such for example as nylon.

In order to provide a substantially uniform, preferably continuous, coating of the resin over and throughout the entire thread surfaces, the thermoplastic resin is provided in particulate form, preferably as a relatively finely divided powder. This particulate material is introduced into the threaded opening so as to completely fill the same with loosely packed particulate material which at that time does not at least substantially fill the thread grooves. Thereafter, the particulate material is compacted in the threaded opening. This may conveniently be accomplished by pressing the excess material into the threaded opening which causes the material to flow into and at least substantially fill the thread grooves. Depending upon the nature and physical properties of the particulate material, an equivalent result may be obtained by subjecting the article to high frequency vibration which causes the particles to flow into the thread grooves.

Thereafter, the internally threaded article is subjected to heat to bring the thread surfaces to a temperature sufficient to at least soften, and preferably to melt, the particles which are in actual physical contact therewith and to cause these particles to adhere thereto. The physical nature of the coating will depend upon the temperature and the duration of application thereof, which may be controlled as desired. In some cases the individual particles directly in contact with the thread surfaces may melt and in their melted condition may bond with adjacent particles to cause them to become a part of the coating.

After the material in contact with and directly adjacent to the thread surfaces has been adhered thereto the excess particulate material is eliminated from the threaded opening. This may be accomplished by projecting an air jet through the opening to cause all particles not specifically adhered therein to be expelled. This air jet during the process of eliminating the excess particles will clear out particles located within the thread grooves but which are not adhered therein.

The excess material may of course be collected for reuse.

BRIEF DESCRIPTION OF THE DRAWING

FIG. 1 is a diagrammatic view illustrating the sequence of steps in the process herein.

FIG. 2 is a fragmentary section on the line 2—2, FIG. 1.

DETAILED DESCRIPTION

Referring now to the drawing, the invention is illustrated in simplified form in which the resin is applied to coat the threads of a nut. The nut may be of square cross-section and provided with a continuous thread extending therethrough from end to end.

A series of nuts 10 is illustrated, the nuts at different spaces in the operation being designated by different letters applied thereto. The nuts are illustrated as advancing from right to left in FIG. 1 on a conveyor 12 which is adapted to close the lower end of the threaded openings 14.

At the position 10a the nut passes beneath a feed nozzle 16 adapted to apply a liberal excess of particulate material 18 to the series of nuts. The resin accordingly substantially fills the threaded openings 14 but in the position 10b the material is illustrated as not entering substantially into the thread grooves, here indicated at 20. An excess of the material is heaped up along the tops of the nuts and particularly projecting above the upper end of the threaded openings 14.

As the nuts continue to advance the particulate or powdered thermoplastic material is compacted in the threaded openings. This may conveniently be accomplished by passing the series of nuts directly below a pressure roll 22 which will press the material overlying the upper open end of the threaded openings downwardly into the openings to compact the material. As a result of this the particles are forced to flow radially and to completely or substantially fill the threaded openings. The excess material at the top of the nuts may remain therein as a compressed layer or may be removed as for example by a scraper blade 24.

Instead of using a pressure roll to compact the particulate material so as to cause it to fill the thread grooves, the articles may be subjected to high frequency vibration as for example by a vibrator diagrammatically indicated at 26. This also will cause the material to settle or be compacted within the openings and to move outwardly so as to fill or substantially fill the thread grooves.

As the articles continue to advance they are led through an induction heating coil 28.

Preferably, it is desirable to insure that the succession of nuts within the coil at any time are in surface-to-surface contact with each other so that in effect the series of nuts being adhered constitutes a single bar.

The intensity of the induction heating and the duration thereof is of course readily controllable. The heating effect is concentrated primarily at the surfaces of the nuts including the thread surfaces thereof. The thread surfaces are brought to a temperature sufficient to melt or at least soften the individual particles in contact therewith and to cause these particles or the material thereof to adhere to the thread surfaces. If the particles are completely melted they may cause adherence of adjacent particles not directly in contact with the thread surfaces.

The nature of the coating produced will thus depend upon the temperature to which the thread surfaces are brought and the time during which they are maintained at such temperature. It is possible by shortening the time interval, as for example by accelerating the rate of advance, to produce a coating composed essentially of still separated individual particles of thermoplastic resin. If the temperature and/or time interval is increased the coating may assume the form of a thin continuous film of substantially uniform thickness.

After the particles have been subjected to the heating step as described in the foregoing, they are advanced beyond the end of the conveyor 12 onto a pair of separated rails 30 provided with guide strips 32, the arrangement being such that the rails 30 leave the lower ends of the articles unobstructed as they continue to advance by being pushed along the rails by the following nuts advanced by the conveyor 12. While the nuts are advancing along the rails 30 they pass beneath a nozzle 34 adapted to project a flow or jet of air downwardly so as to displace the particulate material from the interior of the threaded openings, leaving only those particles adhered, directly or indirectly, to the thread surfaces. As the air jet acts, air is deflected into the thread grooves so that all excess particulate or powdered material is removed therefrom, leaving only the adhered particles therein.

The powdered material forced downwardly by the air flow through the nuts in the position designated 10c may of course be collected in a receptacle 36 for reuse since this material has not been affected in any way by the process described in the foregoing.

While interior threads have previously been provided with deposits of different materials in different ways, the present invention provides a novel article in that the interior thread surfaces are coated substantially uniformly throughout their entire surface from root to crest, without excess of accumulations anywhere, particularly at the extreme roots of the threads.

The method as carried out in a continuous process as illustrated herein provides an extremely rapid and economical method of providing a uniform treatment on large quantities of nuts, in which accurate control as to the precise nature of the coating may be continually maintained.

It is important to note that the operation applies a coating of substantially uniform thickness to the thread surfaces, as measured normal to the thread surfaces. This is clearly illustrated in FIG. 3, where it will be observed that the appearance of a thread surface is preserved at the interior of the nut.

While as illustrated the method provides the coated thread surfaces extending to the ends of the nut, it is of primary importance that the coating be applied completely around the 360° circumferential extent of the threaded opening and between the ends thereof.

An important advantage of the present method is that individual placement of nuts is not required and they may be directed by conventional feeding equipment into alignment on a plain surfaced conveyor, preferably with mutual contact between adjacent nuts. Thus, the entire operation is fully automatic, and this without expensive special equipment.

It will be understood that the nuts after leaving the induction heating coil 28 are allowed to cool sufficiently to cause material of the melted or heat softened thermoplastic particles to set before eliminating the excess particulate material as indicated in conjunction with the nut in the position 10c. Since induction heating acts to first heat the surface of the article, the induction heating may be terminated before the nut body as a whole reaches an elevated temperature and accordingly, termination of the induction heating will result in quick cooling of the surfaces of the article as a result of heat conduction away from the surfaces to the interior of the body. In other words, no particular cooling step is necessary, so long as the elimination of excess particulate material does not immediately follow termination of the heating cycle.

What I claim as my invention is:

1. The method of applying a coating of a thermoplastic resin throughout the complete 360° circumference of the thread surfaces of an internally threaded metal article between the ends thereof, in which the coating is uniform throughout the entire thread surface with respect to its thickness from the roots to the crests of the teeth of the threaded article without excess accumulation anywhere, which comprises completely filling the internally threaded opening of said article throughout the complete 360° circumferential extent thereof between the ends thereof and including the thread grooves with finely divided particles of thermoplastic resin, thereafter heating at least the thread surfaces of said article to a temperature sufficient to at least soften the particles adjacent to and in contact therewith to cause them to bond to the thread surfaces to form a thin coating of substantially uniform thickness, cooling the resin, and eliminating the excess of plastic particles to leave the internally threaded opening void except for the coating of plastic material provided by the material bonded to the thread surfaces.

2. The method as defined in claim 1 in which the step of filling the threaded opening as aforesaid comprises the steps of at least substantially filling the opening with loosely packed particles, and thereafter compacting the thermoplastic material resin in the opening to force particles into the thread grooves.

3. The method as defined in claim 1 in which the step of filling the threaded opening as aforesaid comprises the steps of at least substantially filling the opening with loosely packed particles, and thereafter subjecting the article to high frequency vibration to cause particles to enter and at least substantially fill the thread grooves of the article.

4. The method defined in claim 1 which comprises filling the internally threaded space by providing an excess of particulate material to substantially fill the opening and to project beyond an end thereof, and thereafter applying pressure to the projecting material to force particles within the threaded opening to at least substantially fill the thread grooves.

5. The method as defined in claim 4 in which the step of compacting the material in the opening comprises advancing the article past a pressure roll engageable with the excess of particulate material to force additional material into the threaded opening.

6. The method as defined in claim 1 in which the step of heating the article comprises subjecting the article to the field of an induction heater.

7. The method as defined in claim 6 in which the step of heating comprises passing the article through the coil of an induction heater.

8. The method as defined in claim 7 which comprises assembling a series of articles in contact with each other, and advancing the series through the coil of an induction heater.

9. The method as defined in claim 1 in which the step of eliminating the excess of plastic particles comprises blowing air through the threaded opening.

10. The method of applying a coating of a thermoplastic resin throughout the complete 360° circumference of the thread surfaces of a plurality of internally threaded metal articles, in which the coating is uniform throughout the entire thread surface with respect to its thickness from the roots to the crests of the teeth of the threaded article without excess accumulation anywhere, which comprises advancing a series of the articles on a plain surfaced conveyor with one end of the threaded openings uppermost, applying an excess of finely divided particles of a thermoplastic resin to the articles as they advance to completely fill the cavities formed by the threaded openings except for the thread grooves therein with loosely aggregated particles and to provide an excess of the particulate material extending upwardly from the upper ends of the cavities, packing the particulate material in the threaded openings to substantially fill the thread grooves with particles during continued advance of the articles, heating the articles during continued advance to at least soften the particles in contact with and adjacent to the thread surfaces to cause them to bond thereto, cooling the resin, and during continued advance of the articles eliminating the excess particles from the opening and leaving a coating of substantially uniform thickness on the thread surfaces.

11. The method as defined in claim 10 in which the step of compacting the particles comprises subjecting the articles to high frequency vibration.

12. The method as defined in claim 10 in which the step of compacting the particles comprises passing the series of articles beneath a roller to press the excess material into the thread grooves.

13. The method as defined in claim 10 in which the step of heating the articles comprises subjecting the articles as they advance to induction heating.

14. The method as defined in claim 13 in which the induction heating is obtained by advancing the series of articles through an induction heating coil.

15. The method as defined in claim 14 which comprises providing contact between the articles of the series as they pass through the coil.

16. The method as defined in claim 10 which comprises positioning the articles on a conveyor so that the conveyor closes the lower end of threaded openings in the articles during the step of compacting the particles, and advancing the articles after heating the articles to adhere the particles to the thread surfaces while supporting the articles to leave the lower end of the threaded opening open, and eliminating the excess particulate material by moving it downwardly through the lower open end of the articles.

17. The method as defined in claim 16 in which downward movement of the excess particulate material is accomplished by blowing air downwardly through the upper end of the threaded opening to thereby remove all particles therefrom except those adhered to the thread surfaces.

* * * * *